Figure 2:
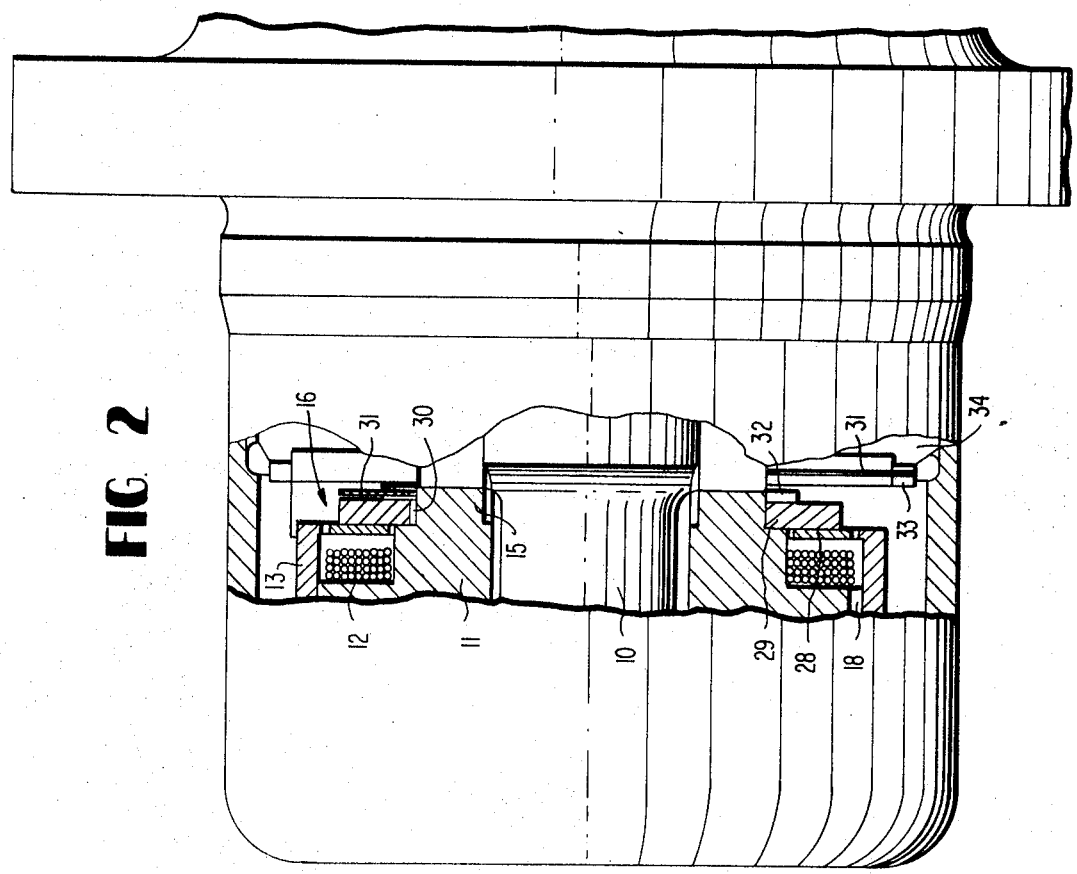

United States Patent [19]
Burckhardt et al.

[11] 3,719,840
[45] March 6, 1973

[54] HIGH FREQUENCY TRANSMITTER, ESPECIALLY FOR BRAKE SLIPPAGE CONTROL INSTALLATION OF MOTOR VEHICLES

[75] Inventors: Manfred H. Burckhardt, Waiblingen; Walter Lutze, Esslingen; Paul Schwerdt, Esslingen-Hegensberg, all of Germany

[73] Assignee: Daimler-Benz Aktiengesellschaft, Stuttgart Untertuerkheim, Germany

[22] Filed: July 13, 1971

[21] Appl. No.: 162,152

[30] Foreign Application Priority Data

July 14, 1970 Germany.................P 20 34 811.2

[52] U.S. Cl...............................310/71, 310/168
[51] Int. Cl..................................H02k 11/00
[58] Field of Search........310/71, 155, 181, 231, 168, 310/194; 336/135

[56] References Cited

UNITED STATES PATENTS

| 3,295,083 | 12/1966 | Fiore | 310/71 X |
| 3,492,518 | 1/1970 | Wayne | 310/155 |

Primary Examiner—D. F. Duggan
Attorney—Craig, Antonelli & Hill

[57] ABSTRACT

A frequency transmitter producing a large number of pulses for the determination of the rotary condition of wheels, especially for brake slippage control installations of motor vehicles, in which a coil for producing a magnetic field is arranged in a non-rotating part and the non-rotating part cooperates with a rotating part by a toothed arrangement; the two ends are lead out of the winding and, bridging a considerable intermediate space, are extended each to an auxiliary winding including only a few turns whereby the ends of the auxiliary windings are directly connected with the electrical connecting parts.

20 Claims, 2 Drawing Figures

PATENTED MAR 6 1973 3,719,840

INVENTORS
MANFRED H. BURCKHARDT
WALTER LUTZE
PAUL SCHWERDT

BY Craig, Antonelli & Hill
ATTORNEYS

HIGH FREQUENCY TRANSMITTER, ESPECIALLY FOR BRAKE SLIPPAGE CONTROL INSTALLATION OF MOTOR VEHICLES

The present invention relates to a frequency transmitter with a large number of pulses, i.e., with high pulse frequencies for determination of the rotary condition of wheels, especially for the brake slippage control installations of motor vehicles, whereby a coil, for producing a magnetic field is arranged in a non-rotating part and the non-rotating part cooperates by means of a toothed arrangement having a large number of teeth with a corresponding toothed arrangement in the rotating part.

With frequency transmitters of the aforementioned type, the manufacture of the coils and, above all, the connection of the coil ends with the contact parts causes considerable difficulties during manufacture and assembly. The installation of the coils takes place as a rule manually so that errors are unavoidable as a result thereof. Additionally, the winding or coil, particularly with the use in a motor vehicle axle, is subjected to considerable accelerations which are caused by the movement of the axle during spring deflections.

The present invention is concerned with the task to avoid the aforementioned difficulties. A coil or winding is to be produced which can be easily manufactured, and the connections of which to the contact places fully satisfy all requirements and withstand all stresses.

The underlying problems are solved according to the present invention with the frequency transmitter of the aforementioned type in that the two ends are lead out of the coil or winding and are each extended to an auxiliary winding including only a few turns, bridging a considerable intermediate space, and are connected at the ends of the auxiliary windings directly with the connecting parts, for example, with the plug-contacts. In other words, the manufacture of the coil takes place in such a manner that at first one auxiliary coil is wound, then the wire is extended to the main winding, subsequently, the main coil is wound and then the wire is lead back to the second auxiliary winding and finally the latter is wound. The winding can take place by means of an automatic winding machine of conventional type. The ends of the auxiliary windings are connected directly with the contact parts, for example, are soldered thereto.

Consequently, the present invention has the general concept for its subject matter to interpose parts between the connecting places of the coil ends with the contacts and the relatively rigid main coil, which parts permit an expansion and therefore prevent a breakage of the wire at the connecting places.

The construction according to the present invention offers the advantage that the connecting places are relieved from tensional stresses. The loads and stresses resulting from the aforementioned accelerations are absorbed by the parts of the wire interconnected between the connecting places and the main coil or winding. Consequently, it is not necessary to interconnect at the coil ends special, more heavy wires as was necessary frequently heretofore in the prior art. The winding operation of the entire coil is therefore considerably simplified so that the manufacture can be realized less expensively.

The auxiliary windings have only a few turns, for example, three or four turns. The winding angle thereby has to be only so large that the auxiliary windings or coils cannot slip on the support bodies thereof.

Frequency transmitters with a magnetizable base body for the coil are known in the art which accommodates axially at one end the coil and carries adjacent thereto on a central extension the rotating part. In that connection, the present invention proposes that two axially extending grooves are provided in the base body, through which the coil ends are extended to a support body for the auxiliary windings arranged at the opposite end of the base body. These axial grooves are preferably disposed at the outer circumference of the base body.

A further feature of the present invention resides in that the support body is constituted by a plastic part made, for example, of any suitable synthetic resinous material, which is provided externally with two annular grooves for the accommodation of the auxiliary windings and is at the same time constructed internally as a central coaxial plug. It is in that connection further proposed according to the present invention that the connecting elements of the coaxial plug are extended radially outwardly up to the base of a respective annular groove.

According to a further feature and development of the inventive concept, the coil is constructed as a so-called winding-body-free coil, i.e., its windings are mounted directly on the base body and are set by a defined current pulse.

The inventive concept can be further developed without limitation to the aforementioned individual features in that the rotating part consists of two ring disks, of which the first disk is stamped out of steel plating and carries the toothed arrangement and the second ring disk consists of sintered metal, for example, of sintered bronze and forms the bearing support. The teeth can thereby be stamped out at the same time during the stamping operation of the ring disk. Furthermore, the possibility exists to make the first ring disk of a permanent magnet material.

The connection of the two ring disks takes place according to the present invention by bonding or gluing. Appropriately, cross grooves are arranged in the bearing surfaces which serve for the accommodation of lubricants and abraded particles. In this manner, a better lubrication is achieved and/or it is prevented that the unavoidable abrasion is deposited between the bearing surfaces so that the latter tend toward seizing. The grooves can thereby be arranged either in the bearing surface of the ring disk or in the bearing surface of the central extension at the base body accommodating the ring disk.

The entrainment of the rotating part takes place appropriately by a so-called cross spring which simultaneously holds the rotating part in the axial direction in constant abutment at the base body. In that case, cross grooves are also provided appropriately in the axially abutting bearing surfaces.

Accordingly, it is an object of the present invention to provide a high frequency transmitter, especially for brake slippage control installations of motor vehicles which avoids the aforementioned shortcomings and drawbacks encountered in the prior art.

Another object of the present invention resides in a frequency transmitter with high pulse repetition rate, especially for brake slippage control installations of motor vehicles in which the coils can be easily and inexpensively wound.

A further object of the present invention resides in a frequency transmitter of the aforementioned type which avoids breaking of the end connections of the coil and minimizes wear and tear of the parts.

A still further object of the present invention resides in a high frequency pulse transmitter, especially for brake slippage control installations of motor vehicles which is characterized by simple manufacture and relatively low cost both in manufacture and installation.

Figure 1:
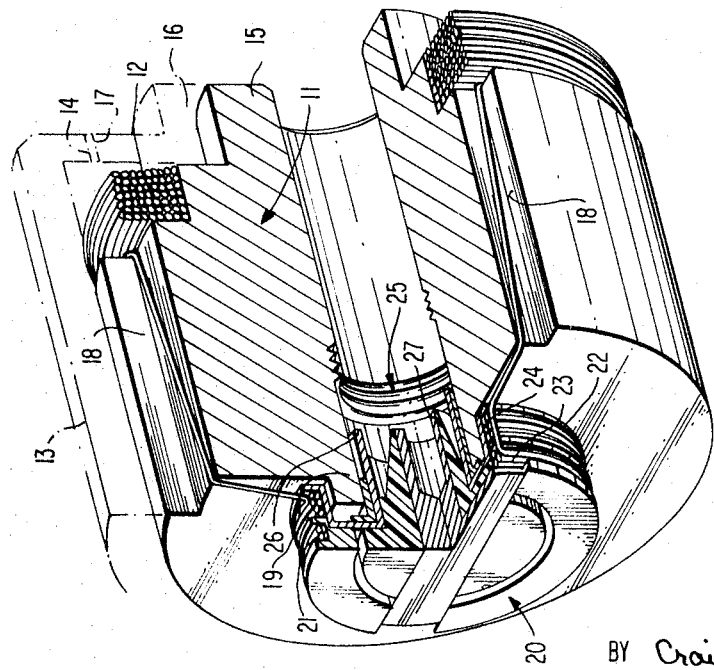

These and further objects, features, and advantages of the present invention will become more obvious from the following description when taken in connection with the accompanying drawing which shows, for purposes of illustration only, one embodiment in accordance with the present invention, and wherein:

FIG. 1 is a perspective view of a frequency transmitter in accordance with the present invention with the base body including the coil and contact places cut open; and FIG. 2 is a partial longitudinal cross-sectional view through the frequency transmitter according to FIG. 1.

Referring now to the drawing wherein like reference numerals are used throughout the two views to designate like parts, the base body 11 of magnetizable material is splined on a fixed axle stub 10 (FIG. 2). This base body 11 accommodates at one end the coil 12. A sleeve 13 is fixedly placed over the base body 11 which at the end adjacent the coil 12 forms by means of the toothed arrangement 14 the pole shoe. At the same end, the base body 11 has an extension 15 on which the rotating part 16 is journalled which, in its turn, is provided radially outwardly with a toothed arrangement 17, and cooperates by means of this toothed arrangement 17 with that at the base body. The operation of the entire frequency transmitter is known as such and does not form any part of the present invention so that further details thereof are not described except insofar as they pertain to the present invention.

Two cross grooves 18 are disposed externally in the base body 11. The ends of the coil 12 are extended through these two cross grooves 18 up to the opposite end of the base body 11. On the end of the base body 11 opposite the coil 12, the base body 11 has an extension 19 on which is mounted a support body generally designated by reference numeral 20. This support body 20 is provided at the outer circumference with two annular grooves 21 and 22 which serve for the accommodation of two auxiliary coils 23 and 24. The support body 20 forms centrally thereof a coaxial plug generally designated by reference numeral 25 whose contact parts 26 and 27 are extended radially outwardly up to the base of the grooves 21 and 22.

The wire ends extended through the cross grooves 18 pass over directly into the two auxiliary windings 23 and 24. The ends of these auxiliary windings 23 and 24 are directly soldered to the contact parts 26 and 27 terminating at the base of the corresponding grooves.

The manufacture of this coil takes place in such a manner that at first the auxiliary coil 24 is wound. It possesses only few turns, for example, three or four turns. The wire is then lead radially outwardly at the base body 11 and axially through a cross groove 18 up to the other end — whereby the automatic winding machine stands still. The main coil 12 is then wound. Subsequently, the wire is lead back through the other cross groove 18 again to the opposite end — whereby the automatic winding machine again stands still — and finally the auxiliary coil 23 is wound which also consists only of a few turns, for example, three or four turns. The wire ends are then soldered to the contact elements at the base of the corresponding grooves. In this manner, the soldered place is relieved of the tension in the wire so that it no longer can tear out. The tensional stress in the wire, as a result of the movements of the axle described hereinabove, is absorbed by the wire sections which are disposed between the auxiliary coils 23 and 24 and the main coil 12.

The support body 20 for the auxiliary windings 23 and 24 consists appropriately of plastic material, for example, any suitable, known synthetic resinous material. All coils are thereby constructed as so-called winding-body-free coils so that they require relatively little space. The hardening or setting of the coils takes place after the winding operation by a defined current pulse.

According to FIG. 2, the rotating part 16 consists of two annular disks 28 and 29. The first-mentioned annular disk 28 forms externally the teeth 17. It is made as a stamped or punched-out part from magnetizable material. Under certain circumstances, also a permanent magnet material may be used. The second annular disk 29 serves for the bearing support of the rotating part 16 on the extension 15. Both annular disks 28 and 29 are bonded or glued to one another. In the bearing surface, i.e., at the inner circumference of the annular disk 29, cross grooves 30 are provided which serve for the accommodation of lubricant or abraded particles.

The entrainment of the rotating part 16 takes place by a so-called cross spring 31 which engages, on the one hand, in grooves 32 at the rotating part 16, i.e., at the annular disk 29, and on the other, in grooves 33 at the wheel body 34. This cross spring 31 axially retains the rotating part at the same time in constant abutment at the base body 11. Also, in these axial abutment surfaces, corresponding grooves may be provided for the accommodation of the lubricant or abraded particles.

While we have shown and described only one embodiment in accordance with the present invention, it is understood that the same is not limited thereto but is susceptible of numerous changes and modifications as are known to those skilled in the art, and we therefore do not wish to be limited to the details shown and described herein, but intend to cover all such changes and modifications as are encompassed by the scope of the appended claims.

We claim

1. A frequency pulse transmitter operable to produce a large number of pulses for the determination of the rotary condition of wheels, especially for brake slippage control installations of motor vehicles, including a primary coil arranged in a non-rotating part, said non-rotating part cooperating with a rotating part by way of oppositely disposed teeth on the respective parts to form a magnetic circuit including said primary coil, characterized in that the respective ends of said primary coil are each extended to a remote position on said non-rotating part and form thereat respective auxiliary coils disposed coaxially with said primary coil and forming part of said magnetic circuit, each auxiliary coil having only a few turns, and the ends of the auxiliary coils being directly connected with respective connecting parts mounted on said non-rotating part, so that the portions of the ends of said primary coil extending to said auxiliary coils serve to relieve the tension on the connection of said ends to said connecting parts.

2. A frequency transmitter according to claim 1, characterized in that the connecting parts form plug-type contact means.

3. A frequency transmitter operable to produce a large number of pulses for the determination of the rotary condition of wheels, especially for brake slippage control installations of motor vehicles, in which a coil means with two ends and operable to produce a magnetic field is arranged in a non-rotating part, and in which the non-rotating part cooperates with a rotating part by teeth means, characterized in that the two ends are lead out of the coil means and, bridging a considerable intermediate space, are extended to a respective auxiliary coil means, each having only a few turns, and in that the ends of the auxiliary coil means are directly connected with respective connecting parts, a magnetizable base body for the coil means which receives axially at one end the coil means and adjacent thereto carries the rotating part on a central extension thereof, characterized in that two axially extending grooves are provided in the base body through which the ends of the coil means are extended to a support means for the auxiliary coil means arranged at the opposite end of the base body.

4. A frequency transmitter according to claim 3, characterized in that the support means is formed by a plastic member which is provided externally with two annular grooves for the accommodation of the auxiliary coil means and internally thereof is constructed as central coaxial plug means.

5. A frequency transmitter according to claim 4, characterized in that connecting elements of the coaxial plug means are extended radially outwardly up to the base of a respective annular groove.

6. A frequency transmitter according to claim 5, characterized in that the coil means is constructed as so-called winding-free-body coil of which the turns are mounted directly on the base body and are set by a defined current pulse.

7. A frequency transmitter according to claim 5, characterized in that the rotating part consists of two annular disks, the first disk being a sheet metal stamping carrying the teeth means and the second disk essentially consisting of sintered metal and forming a bearing support means.

8. A frequency transmitter according to claim 7, characterized in that the second annular disk consists of sintered bronze.

9. A frequency transmitter according to claim 7, characterized in that the first annular disk consists of permanent magnetic material.

10. A frequency transmitter according to claim 7, characterized in that the two annular disks are bonded to each other.

11. A frequency transmitter according to claim 10, characterized in that cross grooves are arranged in the bearing surfaces of the second disk for the accommodation of lubricant and abraded particles.

12. A frequency transmitter according to claim 11, characterized in that the second annular disk consists of sintered bronze.

13. A frequency transmitter according to claim 12, characterized in that the first annular disk consists of permanent magnetic material.

14. A frequency transmitter according to claim 13, characterized in that the coil means is constructed as so-called winding-free-body coil of which the turns are mounted directly on the base body and are set by a defined current pulse.

15. A frequency transmitter according to claim 1, characterized in that the rotating part consists of two annular disks, the first disk being a sheet metal stamping carrying the teeth means and the second disk essentially consisting of sintered metal and forming a bearing support means.

16. A frequency transmitter according to claim 15, characterized in that the second annular disk consists of sintered bronze.

17. A frequency transmitter according to claim 15, characterized in that the first annular disk consists of permanent magnetic material.

18. A frequency transmitter according to claim 15, characterized in that the two annular disks are bonded to each other.

19. A frequency transmitter according to claim 3, wherein said rotating part includes cross grooves in the bearing surfaces thereof contacting said non-rotating part for the accommodation of lubricant and abraded particles.

20. A frequency transmitter according to claim 3, characterized in that the coil means is constructed with the turns thereof mounted directly on the base body and are set by a defined current pulse.

* * * * *